Oct. 30, 1951  V. J. BAST  2,573,299
INJECTOR
Filed May 11, 1948  2 SHEETS—SHEET 1

V. J. Bast
INVENTOR
BY C. A. Snow & Co.
ATTORNEYS.

Oct. 30, 1951 V. J. BAST 2,573,299
INJECTOR
Filed May 11, 1948 2 SHEETS—SHEET 2
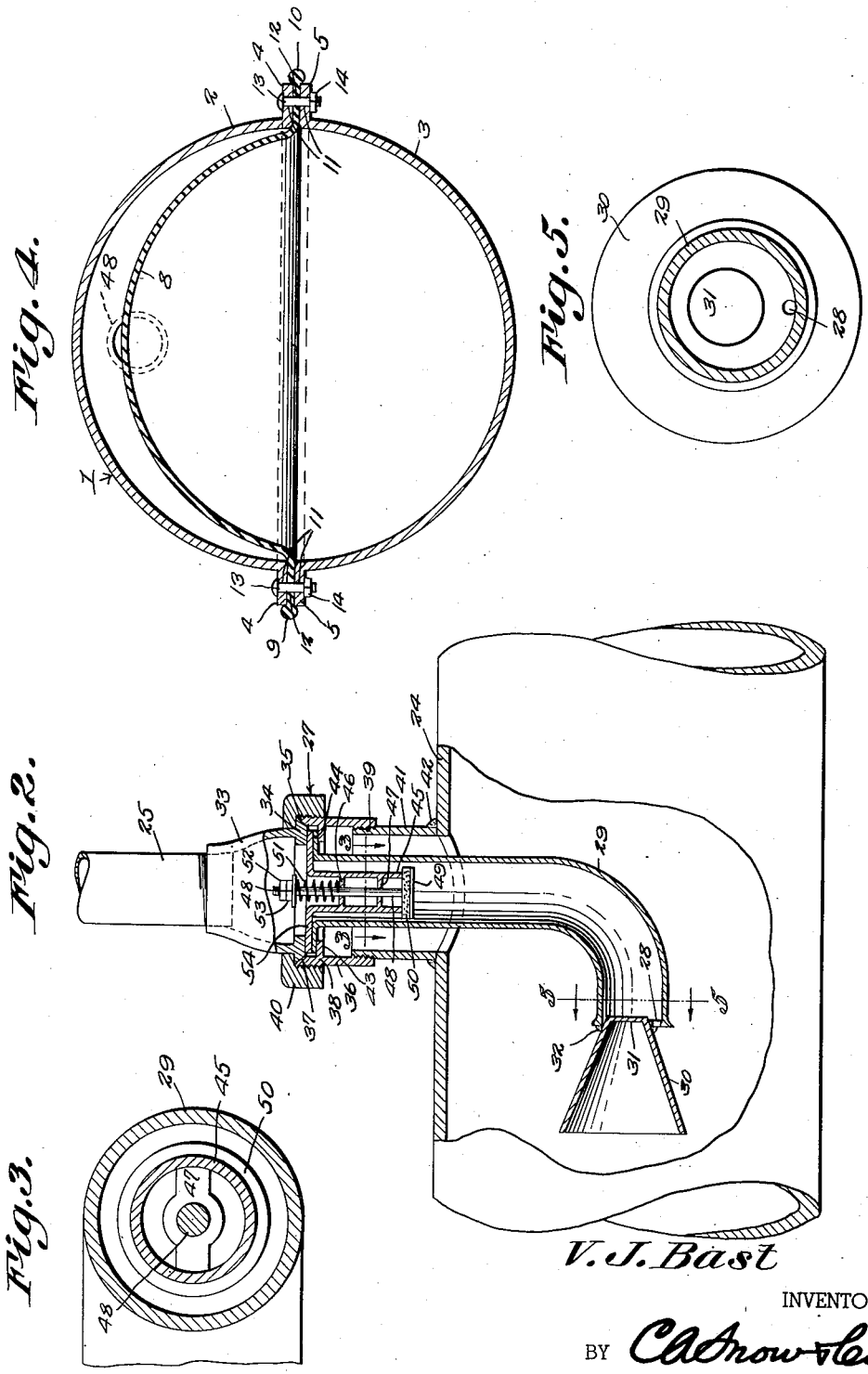
V. J. Bast
INVENTOR
BY C. A. Snow & Co.
ATTORNEYS.

Patented Oct. 30, 1951

2,573,299

UNITED STATES PATENT OFFICE 2,573,299

INJECTOR

Vincent J. Bast, Manitowoc, Wis.

Application May 11, 1948, Serial No. 26,399

1 Claim. (Cl. 137—165)

This invention relates to improvements in injectors.

An object of the invention is to provide an improved injector for injecting one liquid into a second liquid flowing under pressure.

Another object of the invention is to provide a liquid storage tank adjacent a pipe line carrying a second liquid under pressure, and a valve controlled injector associated with said tank between the same and said pipe line for automatically injecting and mixing the liquid from the tank into the fluid under pressure in the pipe line.

A further object of the invention is to provide an improved liquid storage tank and an injector associated therewith which will be highly efficient in operation and relatively inexpensive to manufacture and produce.

Other objects will appear as the description proceeds.

In the accompanying drawings which form a part of this application:

Fig. 2 is an enlarged detail side elevation of the injector and spring loaded check valve, with parts thereof being broken away and in section to show the interior construction thereof.

Fig. 3 is a sectional view taken on the line 3—3 of Fig. 2.

Fig. 4 is a sectional view taken on the line 4—4 of Fig. 1.

Fig. 5 is a sectional view taken on the line 5—5 of Fig. 2.

Like characters of reference are used throughout the following specification and the accompanying drawings to designate corresponding parts.

Figure 1:
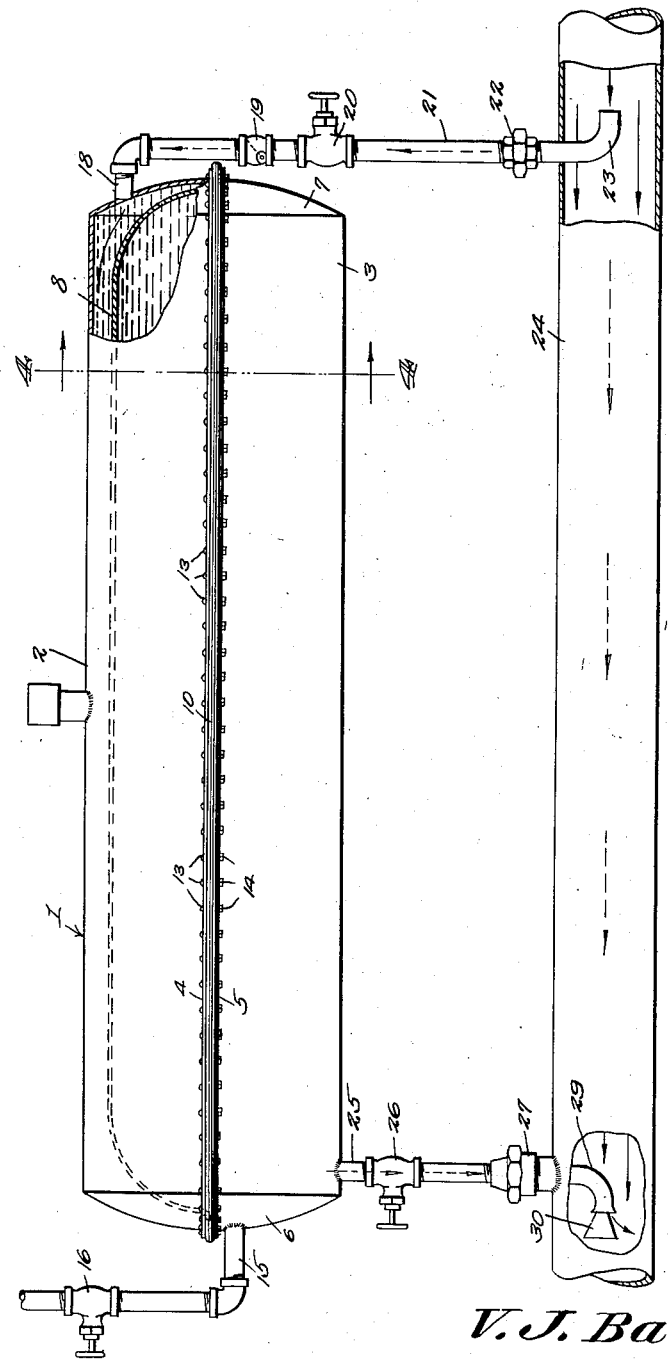
Figure 1 is a side elevation of the improved tank and injector with a portion of the tank being broken away and in section to show the rubber diaphragm in said tank.

In carrying out the invention, there is shown and provided an elongated liquid storage tank generally designated by the reference numeral 1, the same being cylindrical in shape and split longitudinally forming upper and lower halves or chambers 2 and 3 which are formed with the laterally extending oppositely disposed side flanges 4 and 5 respectively. The opposite ends of the tank 1 are closed by means of the dished ends 6 and 7.

A substantial rubber diaphragm 8 is disposed within the tank 1 and extends from end to end, and is formed with the thickened beads 9 and 10 on the opposite side edges for abutting the lateral ends of the side flanges 4 and 5 when the side edges of the diaphragm 8 are clamped between said side flanges 4 and 5.

A series of apertures 11 will be formed through the opposite side flanges 4 and 5 and aligning apertures 12 will be formed through the opposite edges of the diaphragm 8, through which the securing and clamping bolts 13 will extend, the same being held in tight position by means of the nuts 14.

A filler pipe 15 will be connected through the end 6 of the tank 1 for filling the lower portion 3 of the tank 1 with liquid to be mixed with the flow of liquid later to be described. A valve 16 will be incorporated in the filler pipe 15 to control the admission of liquid through the same.

A pressure relief valve will be connected with the upper portion of the tank 1.

A liquid inlet pipe 18 will be connected through the tank end 7 with the upper portion 2 of the tank 1 above the diaphragm 8, and will be provided with a check valve 19 and a manually controlled globe valve 20. Pipe 21 will be connected by means of the union 22 with an L-shape pipe 23 having its lower end disposed axially within the large horizontally disposed pipe 24 facing the flow of liquid passing through the pipe 24, in such a manner that a portion of the liquid which is being pumped through the pipe 24 will enter the inlet pipe past the globe valve 20 and check valve 19 and into the upper portion 2 of the tank 1 pressing downwardly upon the diaphragm 8.

The liquid in the lower portion 3 of the tank 1 will be forced by the pressure upon the diaphragm 8 through the outlet pipe 25 connected with the said lower portion 3 of the tank 1, past the globe valve 26 and adjustable spring tensioned check valve 27 and through a small port 28 at the bottom of the injector pipe 29. An outwardly flared funnel shaped back flow guard member 30 having a closed inner end 31 and highly polished on its outer surface will be welded at 32 thus forming a crescent shaped opening between the end of pipe 29 and the guard member 30. This crescent opening is closed by a flange-like wall in which is provided opening 28. The axially disposed lower end of the L-shaped injector pipe 29 terminates in the main pipe 24, in such a way that the flare of the funnel-shaped member will act as a guard, extending below the port 28 so that any back flow of the liquid will either be trapped in the member 30 or directed away from the port 28 thus directing flow of liquid from said main tank into the injector pipe resulting from back pressure in the pipe 24 and preventing the back pressure liquid from mixing with the liquid passing under pressure through the said main pipe 24.

The check valve generally designated by the reference numeral 27 comprises a reduction union 33 having its lower end formed into a peripheral T-flange 34 which is inwardly and downwardly beveled on its outer edge at 35.

A collar 36 formed with an internal beveled seat 37 in its upper end for engagement with the beveled edge 35 is externally threaded at 38 on its upper end, and internally threaded at 39 on its lower end, said collar 36 being held in place by the unit 40, the lower threaded end 39 of the collar 36 being threaded upon the pipe 41 welded at 42 to the main pipe 24.

An internal flange 43 is formed in the collar 36 and supports the laterally extending flange 44 on the upper end of the injector pipe 29.

The check valve guide housing 45 is formed with upper and lower webs 46 and 47 which are apertured to receive the stem 48 of the check valve 49 which is formed with a rubber seat 50 for engaging the lower end of the housing 45. The check valve 49 is adjustably and resiliently loaded by means of the coil spring 51 and nuts 52 and 53 threaded upon the upper end of the valve stem 48, the lower end of the coil spring 51 engaging the upper surface of the upper web 46.

A laterally extending flange 54 is formed on the upper end of the housing 45 and is clamped with the flange 44 between the T-shape flange 34 and the flange 43 on the collar 36.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A device of the character described, including a liquid storage tank, a rubber diaphragm disposed longitudinally of and interiorly of said tank dividing the storage tank into a lower liquid storage chamber and an upper pressure chamber, a main pipe associated with the pressure chamber through which liquid under pressure is directed, a liquid inlet pipe connected between the pressure chamber of said tank and said main pipe, check and control valves connected with said liquid inlet pipe, an injector pipe connected between said liquid storage chamber and said main pipe, the discharge end of said injector pipe being disposed in the direction of flow of water through the main pipe, and a flared guard member fitted within the discharge end of the injection pipe, the flared guard member extending sufficiently beyond the injector pipe in a radial direction and so constructed as to divert flow in a reverse direction in the main pipe from said injector pipe.

VINCENT J. BAST.

REFERENCES CITED

The following references are of record in the file of this patent:

UNITED STATES PATENTS

| Number | Name | Date |
|---|---|---|
| 1,205,513 | Carlson | Nov. 21, 1916 |
| 1,806,904 | Johnson | May 26, 1931 |
| 1,875,022 | Krueger | Aug. 30, 1932 |
| 2,199,110 | Metz | Apr. 30, 1940 |
| 2,415,534 | Ries | Feb. 11, 1947 |